United States Patent
Chiu et al.

(10) Patent No.: US 6,802,036 B2
(45) Date of Patent: *Oct. 5, 2004

(54) HIGH-SPEED FIRST-IN-FIRST-OUT BUFFER

(75) Inventors: Kenneth Y. Chiu, San Francisco, CA (US); Jurgen M. Schulz, Pleasanton, CA (US); Daniel F. McMahon, Freemont, CA (US); Debaleena Das, Woburn, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 09/992,351

(22) Filed: Nov. 19, 2001

(65) Prior Publication Data

US 2003/0097526 A1 May 22, 2003

(51) Int. Cl.[7] .......................... H04L 1/18; H03M 13/00
(52) U.S. Cl. ............................ 714/751; 714/5; 710/52; 711/100; 345/558
(58) Field of Search ........................ 710/52; 345/558; 365/230.08; 711/100; 714/5, 751

(56) References Cited

U.S. PATENT DOCUMENTS

| | | | |
|---|---|---|---|
| 4,682,284 A | | 7/1987 | Schrofer ................ 364/200 |
| 4,833,655 A | | 5/1989 | Wolf et al. ............. 365/221 |
| 5,056,089 A | * | 10/1991 | Furuta et al. .......... 714/703 |
| 5,224,093 A | * | 6/1993 | Denzel et al. ......... 370/417 |
| 5,349,683 A | * | 9/1994 | Wu et al. ............... 714/801 |
| 5,406,554 A | * | 4/1995 | Parry .................... 370/381 |
| 5,568,443 A | * | 10/1996 | Dixon et al. .......... 365/230.05 |
| 5,572,148 A | * | 11/1996 | Lytle et al. ............ 326/41 |
| 5,642,498 A | * | 6/1997 | Kutner ................... 345/547 |
| 6,044,416 A | * | 3/2000 | Hasan .................... 710/52 |
| 6,172,927 B1 | * | 1/2001 | Taylor ................... 365/219 |
| 6,286,076 B1 | * | 9/2001 | Schultz ................. 711/101 |

OTHER PUBLICATIONS

King et al., Instruction Storage Buffers, IBM Technical Disclosure Bulletin, vol. 13, No. 2, Jul. 1970, p. 420.

* cited by examiner

Primary Examiner—Guy J. Lamarre
Assistant Examiner—John P. Trimmings
(74) Attorney, Agent, or Firm—Park, Vaughan & Fleming LLP (57) ABSTRACT

A buffer, having a first buffer input, a second buffer input, and a buffer output. The buffer is configured to store a plurality of data entries. The buffer includes: a first memory, the first memory having an input and an output. The input of the first memory is coupled to the first buffer input. The buffer also includes a second memory. The second memory has an input and an output. The input of the second memory is coupled to the second buffer input. The buffer also includes a first register. The first register has an input and an output. The input of the first register is coupled to the first buffer input, the second buffer input, the output of the first memory, and the output of the second memory. The output of the first register is coupled to the buffer output. The buffer also includes a second register configured to store a second data entry. The second register has an input and an output. The input of the second register is coupled to the first buffer input, the second buffer input, the output of the first memory, and the output of the second memory. The output of the second register is coupled to the input of the first register.

16 Claims, 7 Drawing Sheets

| Clock Cycle | 1 | 2 | 3 | 4 | 5 | 6 | 7 | 8 | 9 | 10 | 11 |
|---|---|---|---|---|---|---|---|---|---|---|---|
| 1st Data_In | D0 |  | D2 | D4 | D6 | D7 | D9 | D10 | D12 |  |  |
| 2nd Data_In |  | D1 | D3 | D5 |  | D8 |  | D11 |  |  |  |
| Data_Out |  | D0 | D1 | D2 | D3 | D3 | D4 | D5 | D6 | D6 | D7 |
| 1st Buffer Input | W | W | W | W | W | W | W | W | W |  |  |
| 2nd Buffer Input |  |  | W | W |  | W |  | W |  |  |  |
| Output Buffer |  | R | R | R |  | R | R | R |  | R | R |
| 1st Reg |  | D0 | D1 | D2 | D3 | D3 | D4 | D5 | D6 | D6 | D7 |
| 2nd Reg |  |  |  | D3 | D4 | D4 | D5 |  |  | D7 | D8 |
| 3rd Reg |  |  |  |  | D5 | D5 |  |  |  |  |  |
| RAM A Loc. 0 |  |  |  |  |  | D6 | D6 | D6 | D6 | D6 | D6 |
| RAM A Loc. 1 |  |  |  |  |  |  | D8 | D8 | D8 | D8 | D7 |
| RAM A Loc. 2 |  |  |  |  |  |  |  |  |  |  |  |
| RAM A Loc. 3 |  |  |  |  |  |  |  |  |  |  |  |
| RAM B Loc. 0 |  |  |  |  |  |  | D7 | D7 | D7 | D9 | D9 |
| RAM B Loc. 1 |  |  |  |  |  |  |  | D9 | D9 | D11 | D11 |
| RAM B Loc. 2 |  |  |  |  |  |  |  |  | D11 | D10 | D12 |
| RAM B Loc. 3 |  |  |  |  |  |  |  |  |  | D12 |  |
| State | 1st Reg Empty | 1st Reg Full | 1st Reg Full | 2nd Reg Full | 3rd Reg Full | Bypass 2nd & 3rd Reg | Bypass 3rd Reg | Bypass 3rd Reg | Bypass 3rd Reg | Bypass 3rd Reg | Bypass 3rd Reg |

*Figure 4a*

| Clock Cycle | 12 | 13 | 14 | 15 | 16 | 17 |
|---|---|---|---|---|---|---|
| 1st Data_In | | | | | | |
| 2nd Data_In | | | | | | |
| Data_Out | D8 | D9 | D10 | D11 | D12 | |
| 1st Buffer Input | | | | | | |
| 2nd Buffer Input | | | | | | |
| Output Buffer | R | R | R | R | R | |
| 1st Reg | D8 | D9 | D10 | D11 | D12 | |
| 2nd Reg | D9 | D10 | D11 | D12 | | |
| 3rd Reg | | | | | | |
| RAM A Loc. 0 | | | | | | |
| RAM A Loc. 1 | D10 | | | | | |
| RAM A Loc. 2 | D12 | | | | | |
| RAM A Loc. 3 | | | | | | |
| RAM B Loc. 0 | | | | | | |
| RAM B Loc. 1 | | | | | | |
| RAM B Loc. 2 | D11 | | | | | |
| RAM B Loc. 3 | | | | | | |
| State | Bypass 3rd Reg | Bypass 3rd Reg | Bypass 3rd Reg | 2nd Reg Full | 1st Reg Full | 1st Reg Empty |

HIGH-SPEED FIRST-IN-FIRST-OUT BUFFER

1. FIELD OF THE INVENTION

This invention relates to electronic devices, and more particularly to a high-speed memory-based buffer, and system and method for use thereof.

2. BACKGROUND

Hardware buffers are devices that receive bits from one or more devices, store the bits temporarily, and then provide the bits to other device(s). Buffers are often used to interface devices that operate at different speeds or with different sets of priorities. A buffer allows faster devices to operate on a data stream without being held up by slower devices.

One characteristic of a buffer is the size of the buffer, including the depth (i.e., the number of different data entries which can be stored concurrently) as well as the width (i.e., the number of bits that can be comprised in a single data entry).

As the speed of computer systems increases, maintaining low latency, i.e., the time required to read data from the buffer after data has been written into the buffer, is increasingly important. Thus, it is desirable to have a buffer with a large depth and a minimal latency. Preferably, the turn-around time should have no latency, that is, data entries should be accepted into the buffer on each clock cycle until the buffer can no longer accept data entries and data entries should be available to be read out on each clock cycle until the buffer is empty. The buffer should also be relatively deep and wide. In addition, it is desirable that the buffer protect against data corruption.

3. SUMMARY OF INVENTION

One embodiment of the invention is a buffer, having a first buffer input, a second buffer input, and a buffer output. The buffer is configured to store a plurality of data entries. The buffer includes: a first memory, the first memory having an input and an output. The input of the first memory is coupled to the first buffer input. The buffer also includes a second memory. The second memory has an input and an output. The input of the second memory is coupled to the second buffer input. The buffer also includes a first register. The first register has an input and an output. The input of the first register is coupled to the first buffer input, the second buffer input, the output of the first memory, and the output of the second memory. The output of the first register is coupled to the buffer output. The buffer also includes a second register configured to store a second data entry. The second register has an input and an output. The input of the second register is coupled to the first buffer input, the second buffer input, the output of the first memory, and the output of the second memory. The output of the second register is coupled to the input of the first register.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 Dual Buffer Input Embodiment

Figure 1:
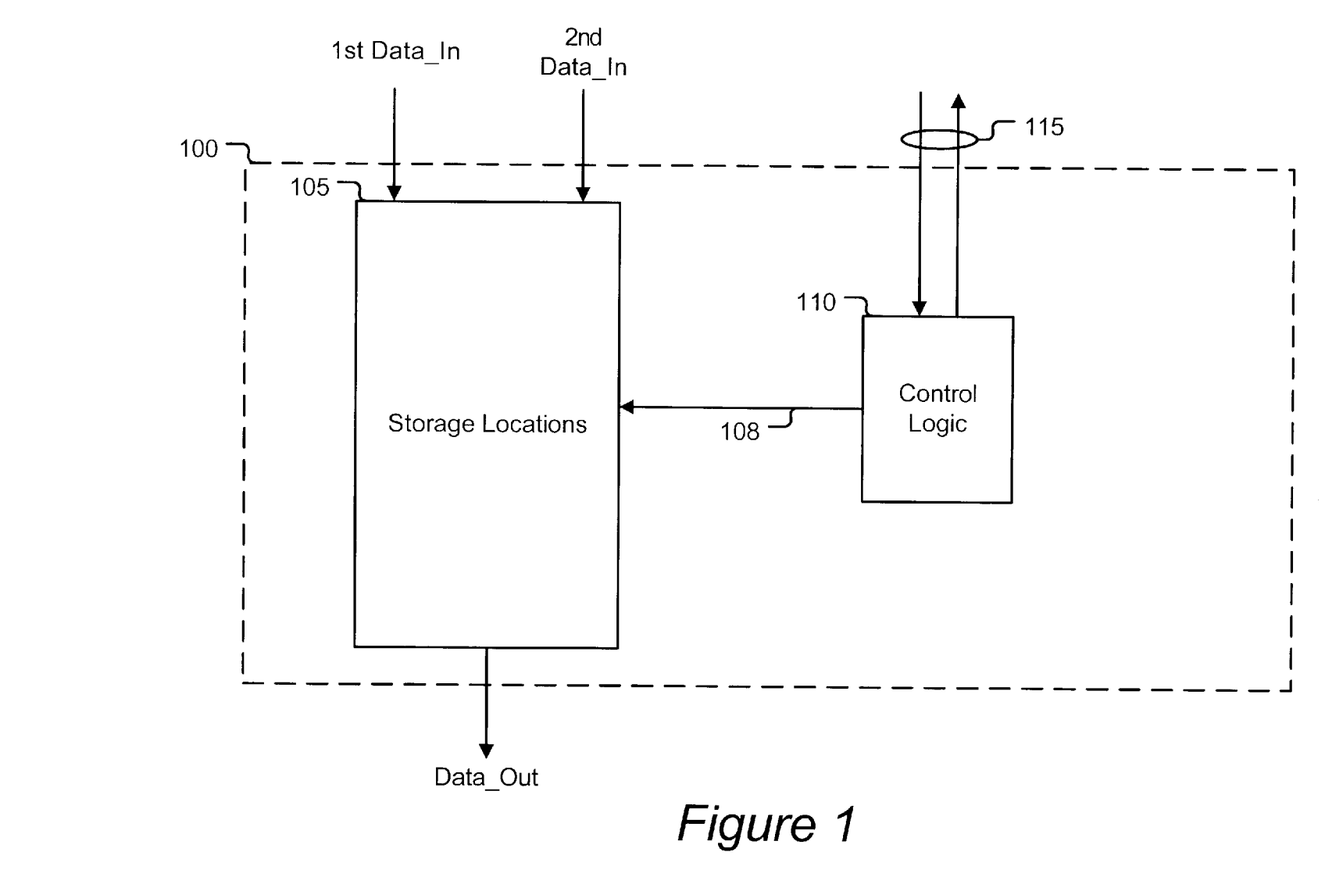
FIG. 1 presents a block diagram of a buffer.

Referring to FIG. 1, a block diagram of an embodiment of a first-in-first-out (FIFO) buffer 100 is shown. Data entries can be written into the buffer 100 from a first buffer input ($1^{st}$ Data_In line) and/or a second buffer input ($2^{nd}$ Data_In line). After the data entries are written into the buffer 100, the data entries can be stored in storage locations 105. The storage locations 105 may include memory, registers, and/or other storage elements that operate to accept, maintain, and yield data entries. As shown in FIG. 1, control logic 110 outputs control signals 108 to the storage locations 105. These signals 108 control the storage locations in which the data entries are stored. Control logic 110 may include one or more combinational logic circuits and/or state machines.

Data entries are read out of the buffer 100 via a buffer output (Data_Out line). The control signals 108 also control the storage locations from which data entries are read and output.

It is noted that the buffer 100 may operate according to one or more buffer control I/O signals, such as READ, WRITE, FULL, and EMPTY signals, and one or more clock signals, collectively 115. READ and WRITE signals may be utilized to read and write, respectively, from the buffer 100. The FULL and EMPTY signals may be utilized to allow one or more external devices to know when the buffer 100 is full or empty of data entries.

Figure 2:
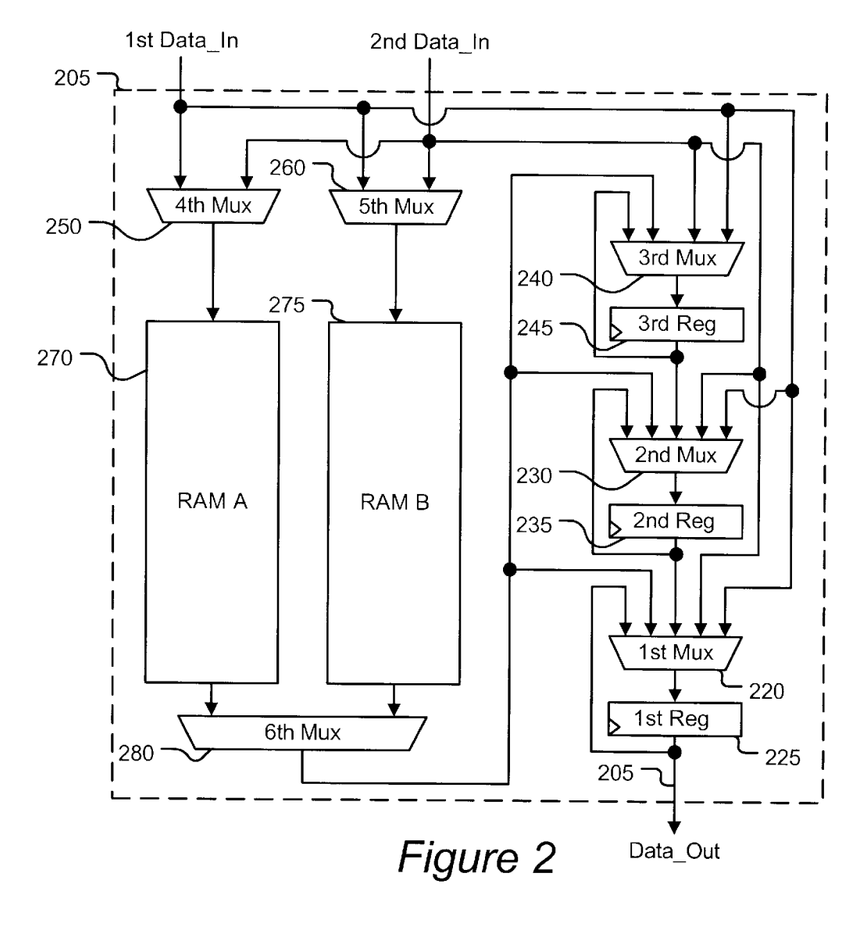
FIG. 2 presents a block diagram of a portion of a buffer.

Referring to FIG. 2, one embodiment of the storage locations 105 of FIG. 1 is shown. As shown in FIG. 2, storage locations 205 include a plurality of registers 225, 235, and 245 and a plurality of memories 270 and 275.

As shown in FIG. 2, the first register 225 can receive data entries, via a first multiplexer 220, from a number of different sources. In the embodiment shown in FIG. 2, the first register 225 can receive data entries from the second register 235, the first RAM 270, the second RAM 275, the $1^{st}$ Data_In line, and the $2^{nd}$ Data_In line. In addition, the first register 225 can receive data entries from the output of the first register 225. The output of first register 225 is the buffer output.

In the embodiment shown in FIG. 2, the second register 235 can receive data entries, via a second multiplexer 230, from the third register 245, the first RAM 270, the second RAM 275, the $1^{st}$ Data_In line, and the $2^{nd}$ Data_In line. In addition, the second register 235 can receive data entries from the output of the second register 235. The output of second register 235 is coupled to the first multiplexer 220.

In the embodiment shown in FIG. 2, the third register 245 can receive data entries, via a third multiplexer 240, from the first RAM 270, the second RAM 275, the $1^{st}$ Data_In line, and the 2$^{nd}$ Data_In line. In addition, the third register 245 can receive data entries from the output of the third register 245. The output of third register 245 is coupled to the second multiplexer 230. The output of the first RAM 270 is coupled, via a sixth multiplexer 280, to the first multiplexer 220, the second multiplexer 230, and the third multiplexer 240.

Referring again to FIG. 2, the first RAM 270 can receive data entries, via a fourth multiplexer 250, from the 1$^{st}$ Data_In line and the 2$^{nd}$ Data_In line. Similarly, the second RAM 275 can receive data entries, via a fifth multiplexer 260, from the 1$^{st}$ Data_In line and the 2$^{nd}$ Data_In line. The output of the second RAM 275 is coupled, via the sixth multiplexer 280, to the first multiplexer 220, the second multiplexer 230, and the third multiplexer 240.

The multiplexers 220, 230, 240, 250, 260, and 280 receive control signals from the control logic 110 to select the source of data entries. Similarly, the registers 225, 235, 245, and the RAMs 270 and 275 receive control signals from the control logic 110. However, in order not to obscure the invention, such control signals are not shown.

5.2 Dual Input Buffer with Error Correction

Figure 3:
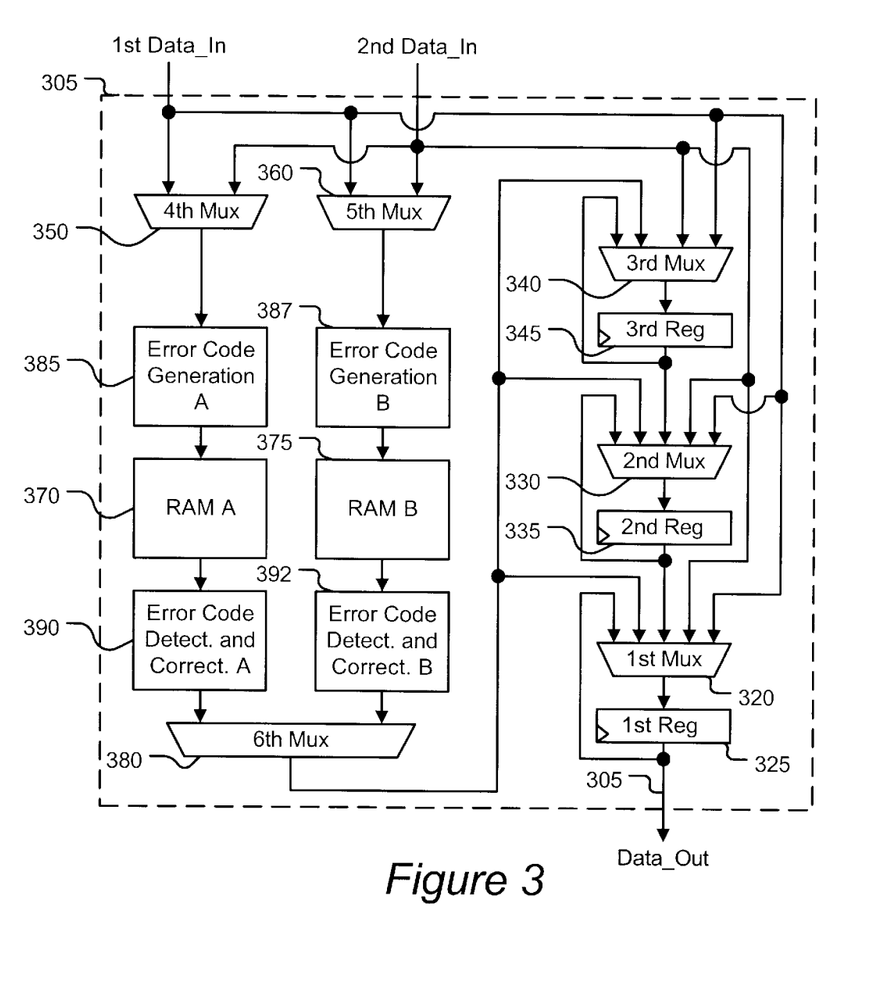
FIG. 3 presents a block diagram of a portion of a second buffer.

Another embodiment of the storage locations 105 is shown in FIG. 3. This embodiment is similar to storage locations 205. However, as shown in FIG. 3, error code generation circuits 385 and 387 are placed between the multiplexers 350 and 360 and the RAMs 370 and 375. In addition, error code detection and correction circuits 390 and 392 are placed between the RAMs 370 and 375 and the sixth multiplexer 380. The addition of these error code circuits 385, 387, 390, and 392 enable the buffer 100 to detect and correct any errors that are generated when storing or retrieving data entries from the first or second RAMs 370 and 375.

5.3 Operation of the Dual Input Buffer with Error Correction

The general operation of the buffer 305 may be broadly summarized as follows. A data entry received from either the 1$^{st}$ Data_In line or the 2$^{nd}$ Data_In line is input to the first register 325, the second register 335, or the third register 345. If the first register 325 is empty, then the data entry is stored in the first register 325. If the first register 325 is full, then the data entry is stored in the second register 335. If the second register 335 is also full, then the data entry is stored in the third register 345. If all three registers 325, 335, and 345 are full, then the data entry is stored in either the RAM A 370 or the RAM B 375.

Figure 4A:
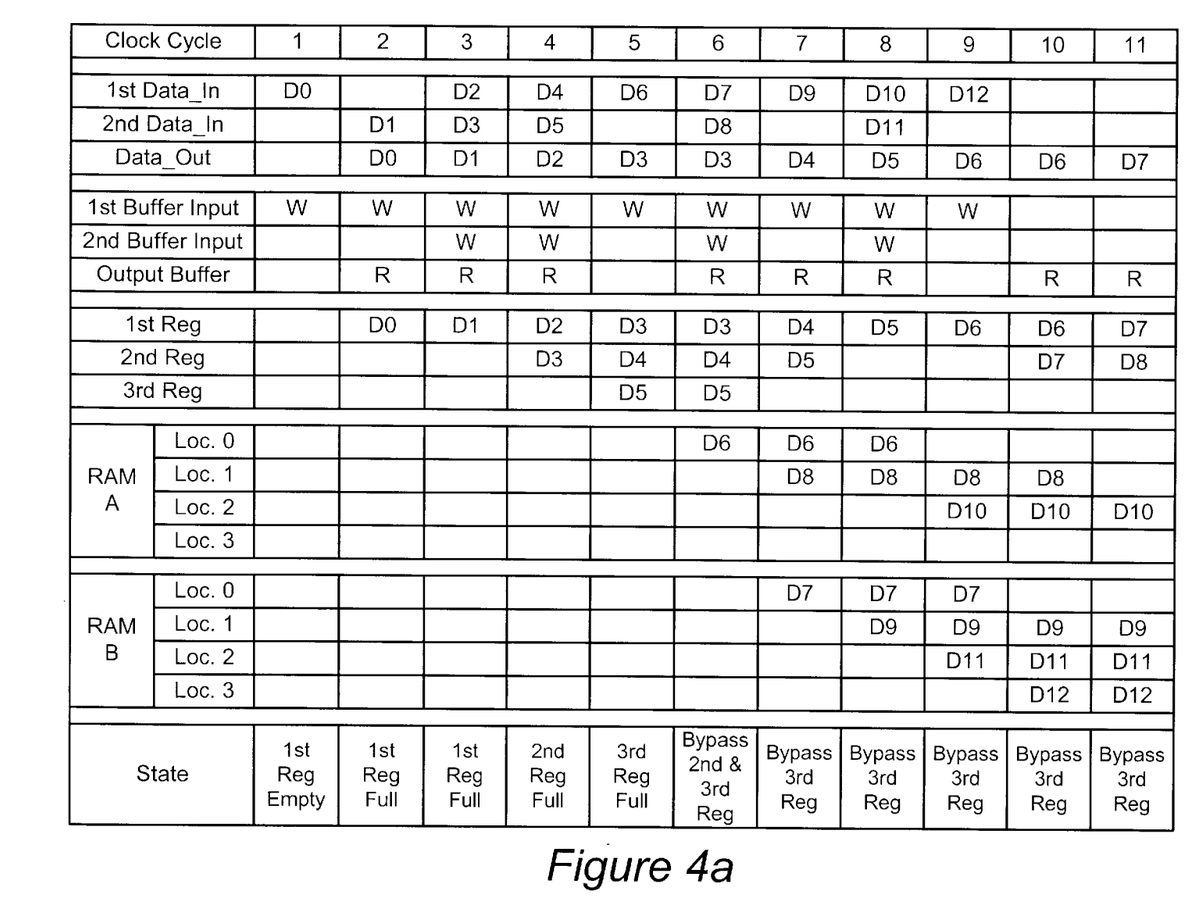
FIGS. 4a and 4b present a timing diagram of one method of operating a buffer.
Figure 4B:
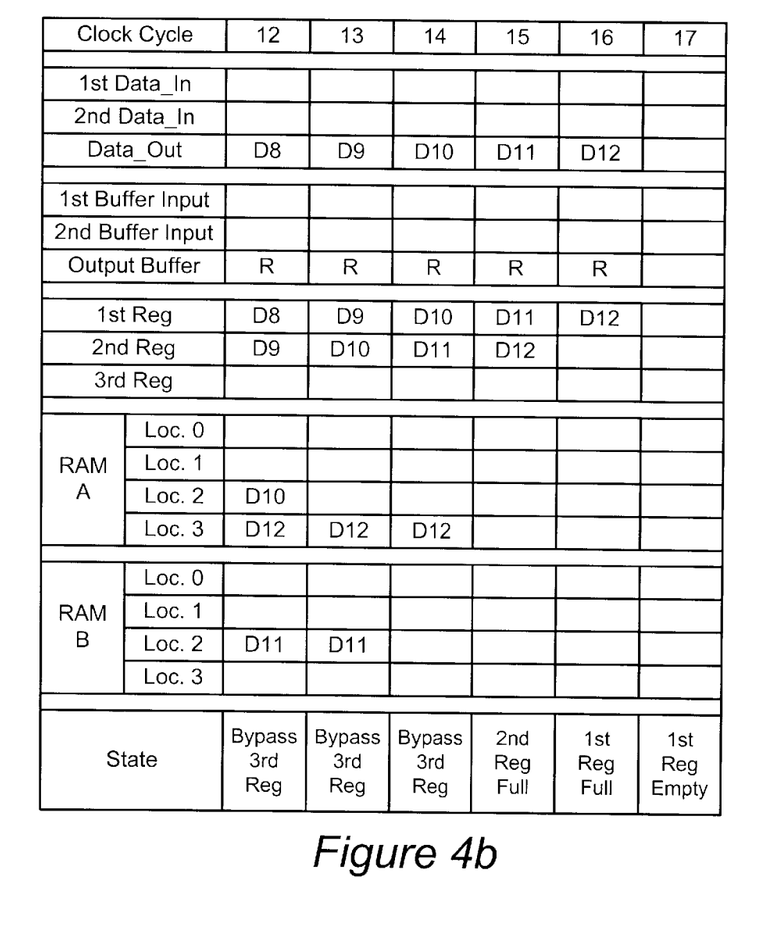

While data can be output from a register 325, 335, or 345 in one cycle, it takes a plurality of cycles to output data from the RAMs 370 and 375. Thus, in order to keep the first register 325 full of data, data will be read in advance from the RAMs 370 and 375 and stored in the first register 325 or the second register 335 a plurality of cycles later. As a result, some registers will be "bypassed." A better understanding of the operation of the buffer 100 may be gained by reference to the timing diagram shown in FIG. 4.

Referring to FIG. 4, at clock cycle 1, the buffer does not contain any data. However, at clock cycle 1, data D0, which is present on the 1$^{st}$ Data_In line, is written to the buffer 100. As a result, data D0 will be stored one clock cycle later in the first register 325. At clock cycle 2, data D1, which is present on the 2$^{nd}$ Data_In line, is written into the buffer 100. At the same time data D0, which is now stored in the first register 325, is read out of the buffer 100 via the Data_Out line.

At clock cycle 3, data D2, which is present on the 1$^{st}$ Data_In line, and data D3, which is present on the 2$^{nd}$ Data_In line, is written to the buffer 100. At the same time, data D1, which is stored in the first register 325 as a result of the write that occurred in cycle 2, is read out of the buffer 100. At clock cycle 4, data D4 and data D5 is written to the buffer 100 while data D2 is read out of the buffer. At this time, data D2 and data D3 are stored in the first register 325 and the second register 335 respectively.

At clock cycle 5, data D6 is written to the buffer. At this time all three registers 325, 335, and 345 contain data. The first register 325 contains data D3, which was received from the second register 335. The second register 335 and the third register 345 contain data D4 and data D5 respectively as a result of the write that occurred in cycle 4.

At clock cycle 6, data D7 and D8 are written to the buffer 100 and data D3 is read out of the buffer 100. Because all three of the registers are full, data D6, which was written to the buffer 100 at clock cycle 5, is stored in location 0 of RAM A 370. While a register can be read in a single cycle, data from the RAMs 370 and 375 takes a plurality of cycles to be read. Thus, in order to keep the first register 325 full of data, data must be read from the RAMs 370 and 375 in advance of the time that it is needed in the first register 325. Assuming that it takes three cycles to read data from RAM A 370 and then detect and correct any errors, the process of reading data D6 from location 0 of RAM A 370 is begun in cycle 6 so that in cycle 9, the data D6 will be stored in the first register 325. As a result, the second register 335 and the third register 345 are "bypassed."

At clock cycle 7, data D9 is written to the buffer 100 and Data D4 is read from the buffer 100. At this time, data D4 is stored in the first register 325 from the second register 335. Similarly, data D5 is stored in the second register 335 from the third register 345. However, the third register 345 is empty. In order to keep the first register full of data, the process of reading data D7 from RAM B 375 and storing data D7 in the second register 335 in cycle 10 is begun at this time. As a result, the third register 345 is "bypassed."

At clock cycle 8, data D10 and data D11 are written to the buffer 100 and data D5 is read from the buffer 100. At this time, the second register 335 and the third register 345 are empty. The process of reading data D9 from RAM B 375 and storing data D9 in the second register 335 in cycle 11 is begun at this time.

At clock cycle 9, data D12 is written to buffer 100. At this time, data D6 is stored in the first register 325 from location 0 in RAM A 370. The process of reading data D10 from RAM A 370 is also begun at this time.

At clock cycles 10 through 13, data is read out of the buffer 100. In order to keep the first register 325 full, data is read from the RAMs 370 and 375 and placed in the second register 335 three cycles after the read process begins. Upon each clock cycle, the data from the second register 335 is transferred to the first register 325 so that it can be output by the buffer 100.

At clock cycle 14, data D10 is read from buffer 100. In addition, at this time, the process of reading data D12 from RAM A 370 is still continuing. At cycle 15, data D11 is read out of the buffer 100. At this time, the processes of reading data D12 is completed and data D12 is stored in the second register 335. At cycle 16, data D12 is transferred to the first register and then read out of the buffer. At cycle 17, the buffer is empty.

The registers 325, 335, and 345 allow the buffer 100 to have a low latency between read and write cycles. As discussed above, the buffer 100 writes an incoming data entry into the registers 325, 335, and 345 before filling the RAMs 370 and 375. Thus, the buffer 100 can provide data entries from the registers 325, 335, and 345 in one clock cycle. In addition, the RAMs 370 and 375 provide additional data entry storage, albeit in a slower storage space.

5.4 Dual Input Buffer with Diagnostics

In some embodiments of the invention, the buffer 100 may include diagnostic circuitry within its control logic 110. For example, when the buffer is in a diagnostic mode, the control logic 110 could be configured to keep a history of all data written to the buffer 100 for a limited period of time to allow debugging of errors. In some embodiments of the invention, such data entries could be stored in the first and second RAMs even if the data entries were also stored in the registers directly from the Data_In lines.

5.5 Other Embodiments of the Input Buffer

Figure 5:
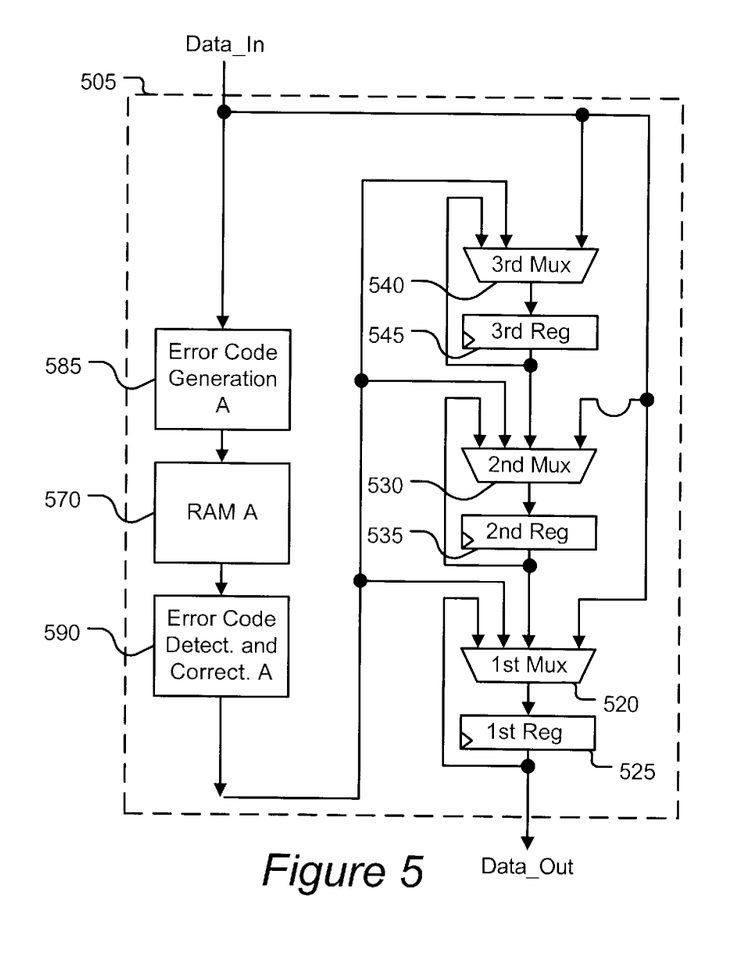
FIG. 5 presents a block diagram of a portion of a third buffer.

The above-described buffers include two inputs. However, in some embodiments of the invention, only a single buffer input would be present. For example, FIG. 5 presents a buffer that includes only a single buffer input.

Figure 6:
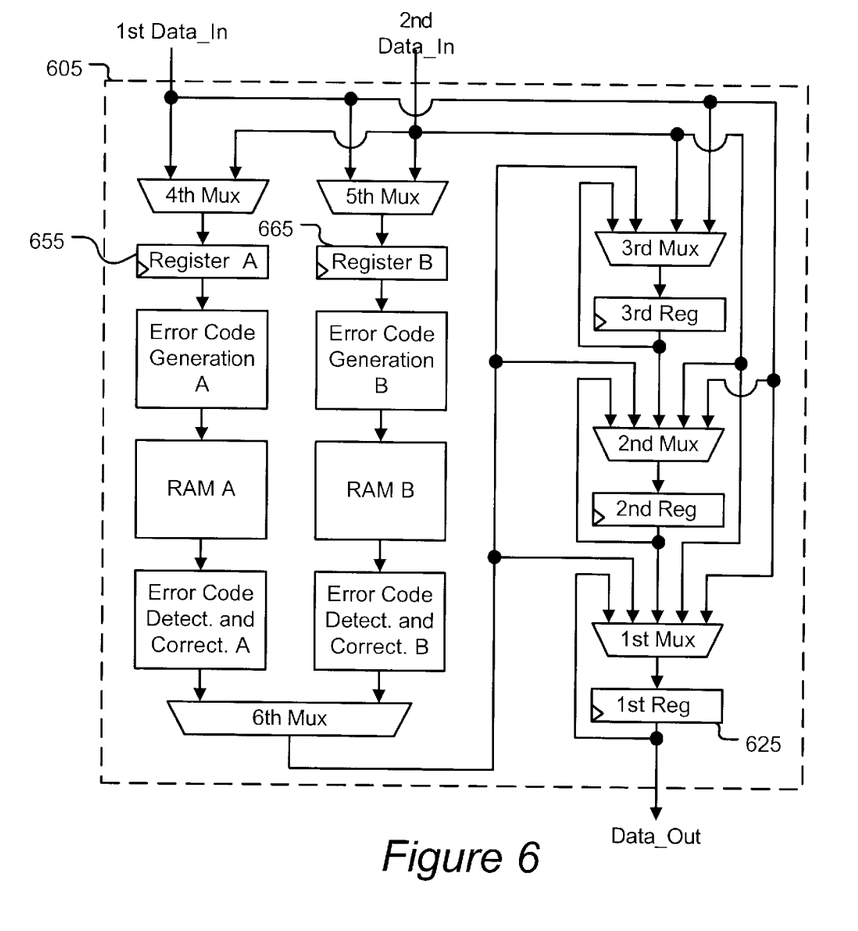
FIG. 6 presents a block diagram of a portion of a fourth buffer.

In still other embodiments of the invention, as shown in FIG. 6, registers 655 and 665 may be utilized to buffer data before the data is received by the RAMs or is received by the error code generation circuits. If such registers are utilized, then a fourth register (not shown) may be required to insure that the first register 625 remains full under all circumstances.

5.6 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A buffer, having a first buffer input, a second buffer input, and a buffer output, the buffer configured to store a plurality of data entries, the buffer comprising:
    a) a first memory, the first memory having an input and an output, the input of the first memory being coupled to the first buffer input;
    b) a second memory, the second memory having an input and an output, the input of the second memory being coupled to the second buffer input;
    c) a first register, the first register having an input and an output, the input of the first register being coupled to the first buffer input, the second buffer input, the output of the first memory, and the output of the second memory, the output of the first register being coupled to the buffer output; and
    d) a second register configured to store a second data entry, the second register having an input and an output, the input of the second register being coupled to the first buffer input, the second buffer input, the output of the first memory, and the output of the second memory, the output of the second register being coupled to the input of the first register.

2. The buffer of claim 1 further comprising:
    a) a third register, the third register having an input and an output, the input of the third register being coupled to the first buffer input, the second buffer input, the output of the first memory, and the output of the second memory, the output of the third register being coupled to the input of the second register.

3. The buffer of claim 1 further comprising:
    a) control logic coupled to the first memory, the second memory, the first register, and the second register.

4. The buffer of claim 3, wherein the control logic includes diagnostic circuitry.

5. The buffer of claim 1, wherein the first buffer input is coupled to the first memory by a multiplexer.

6. The buffer of claim 1, wherein the first register is coupled to the first buffer input by a multiplexer.

7. The buffer of claim 1, wherein the first register is coupled to the output of the first memory by a multiplexer.

8. The buffer of claim 1, wherein the first buffer input is coupled to the first memory by a register and a multiplexer, the register having an output that is coupled to the input of the multiplexer.

9. A buffer, having a first buffer input, a second buffer input, and a buffer output, the buffer configured to store a plurality of data entries, the buffer comprising:
    a) a first error generation code circuit having an input and an output, the input of the first error generation code circuit being coupled to the first buffer input;
    b) a first memory, the first memory having an input and an output, the input of the first memory being coupled to the output of the first error generation code circuit;
    c) a first error code detection and correction circuit having an input and an output, the input of the first error code detection and correction circuit coupled to the output of the first memory;
    d) a second error generation code circuit having an input and an output, the input of the second error generation code circuit being coupled to the second buffer input;
    e) a second memory, the second memory having an input and an output, the input of the second memory being coupled to the output of the second error generation code circuit;
    f) a second error code detection and correction circuit having an input and an output, the input of the second error code detection and correction circuit coupled to the output of the second memory;
    g) a first register, the first register having an input and an output, the input of the first register being coupled to the first buffer input, the second buffer input, the output of the first error code detection and correction circuit, and the output of the second error code detection and correction circuit, the output of the first register being coupled to the buffer output; and
    h) a second register configured to store a second data entry, the second register having an input and an output, the input of the second register being coupled to the first buffer input, the second buffer input, the output of the first error code detection and correction circuit, and the output of the second error code detection and correction circuit, the output of the second register being coupled to the input of the first register.

10. The buffer of claim 9 further comprising:
    i) a third register, the third register having an input and an output, the input of the third register being coupled to the first buffer input, the second buffer input, the output of the first error code detection and correction circuit, and the output of the second error code detection and correction circuit, the output of the third register being coupled to the input of the second register.

11. The buffer of claim 9 further comprising:
   i) control logic coupled to the first memory, the second memory, the first register, and the second register.

12. The buffer of claim 11, wherein the control logic includes diagnostic circuitry.

13. The buffer of claim 9, wherein the first buffer input is coupled to the first error code generation circuit by a multiplexer.

14. The buffer of claim 9, wherein the first register is coupled to the first buffer input by a multiplexer.

15. The buffer of claim 9, wherein the first register is coupled to the output of the first error code detection and correction circuit by a multiplexer.

16. The buffer of claim 9, wherein the first buffer input is coupled to the first error generation code circuit by a register and a multiplexer, the register having an output that is coupled to the input of the multiplexer.

* * * * *